United States Patent [19]
Gehring

[11] Patent Number: 5,256,834
[45] Date of Patent: Oct. 26, 1993

[54] JUNCTION CENTER

[76] Inventor: Stephen A. Gehring, W1294 Hwy. 60, Rubicon, Wis. 53078

[21] Appl. No.: 797,222

[22] Filed: Nov. 25, 1991

[51] Int. Cl.[5] .................................... H02G 9/06
[52] U.S. Cl. .................................. 174/37; 174/38; 174/50; 174/65 R; 285/128; 405/36
[58] Field of Search ................ 174/37, 38, 39, 48, 174/50, 65 R; 137/236.1; 405/36, 37, 40, 41; 285/128

[56] References Cited

U.S. PATENT DOCUMENTS

| | | | |
|---|---|---|---|
| 3,110,753 | 11/1963 | Witort | 174/65 R |
| 4,264,779 | 4/1981 | Rhodes et al. | 174/48 |
| 4,959,506 | 9/1990 | Petty et al. | 174/65 R |
| 4,997,312 | 3/1991 | Regan | 405/36 |

FOREIGN PATENT DOCUMENTS 2425164  1/1980  France ........................ 174/65 R Primary Examiner—Leo P. Picard
Assistant Examiner—Hyung S. Sough
Attorney, Agent, or Firm—Donald Cayen

[57] ABSTRACT

A junction center is useful for wiring the electrical pump and alarm system circuits of sanitary mound systems and of the lift stations of conventional septic systems The junction center comprises a relatively large diameter main tube of electrical conduit placed against the outside of the sanitary system sewer riser. A branch tube extends through the wall of the main tube and through a hole in the wall of the sewer riser. Supply wires are fed from a trench into the main tube from the bottom end and out the top end. Wiring from the pump and alarm system are fed from the sewer riser through the branch tube and into the main tube interior and out the main tube top end. The wires are connected outside of the main tube; then the wires are pushed back into the main tube. If the pump and alarm system operate on different voltages, a divider in the main tube divides the interior thereof into separate passages for the pump and alarm system wires. The branch tube is slotted inside the main tube to provide support and guidance for the divider. The main tube top end is covered with a removable cap.

5 Claims, 2 Drawing Sheets

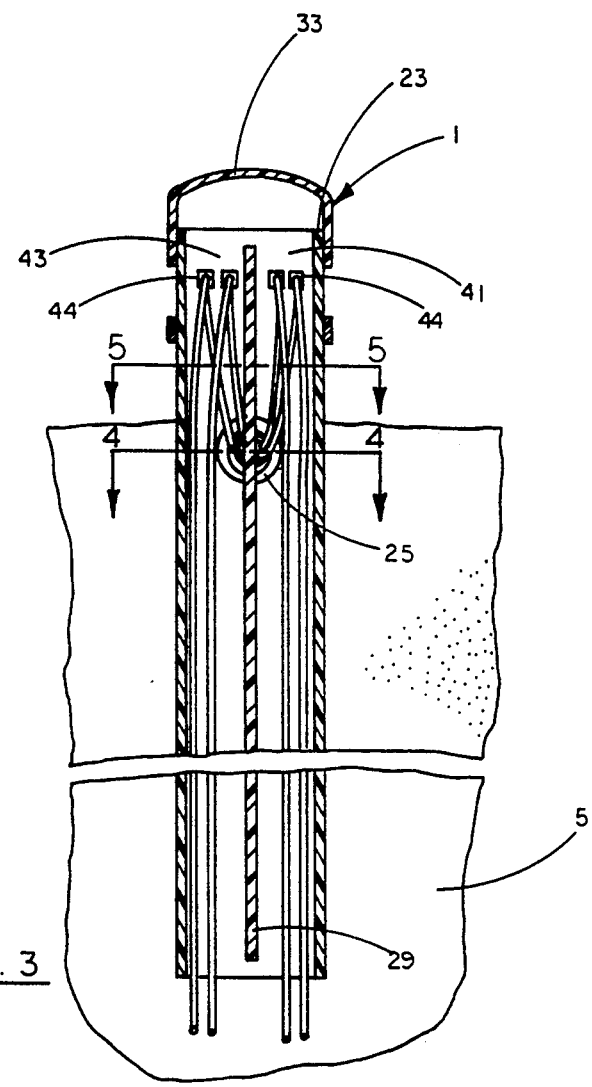
FIG. 3
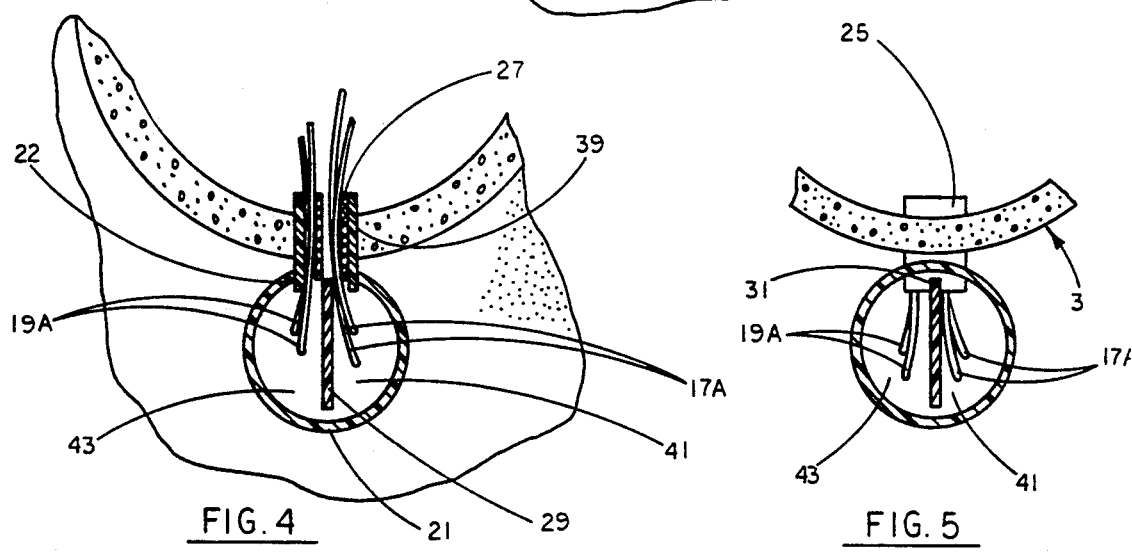
FIG. 4
FIG. 5

JUNCTION CENTER

BACKGROUND OF THE INVENTION

1. Field of the Invention.

This invention pertains to electrical systems, and more particularly to apparatus for enclosing electrical wiring.

2. Description of the Prior Art.

Various types of products have been developed to enclose electrical wiring in outdoor environments. To assure the safety of electricians working on an installation and of the public in general, outdoor wiring must meet rigid standards. For example, outdoor wiring in Wisconsin is subject to the provisions of Wisconsin Statutes Chapter 101 Subchapter IV.

A particularly important application of outdoor wiring involves rural sanitary systems. In so-called mound systems, a submersible electric pump is used to pump liquid from a holding tank to a distribution bed. The pump is usually located inside a tubular concrete sewer riser, which is covered by a concrete cover. The mound system usually includes an alarm system that gives warning of an impending malfunction. The alarm system may operate on a lower voltage than the pump. Lift stations in conjunction with conventional septic tanks and drain fields also use submersible electric pumps, either with or without alarm systems.

A difficult problem encountered in constructing outdoor sanitary systems, whether mound types or conventional types that include lift stations, concerns the connecting of the wiring for the pump and alarm system to the wiring from a power source. The wiring must, of course, meet all applicable standards. Specifically, the wire connections must be made above ground level, and they cannot be made in the sewer riser. Further, the connections must be inside a weather resistant enclosure that is sealed from moisture from the sewer riser. The relatively high voltage wires for the pump must be separated from the relatively low voltage wires for the alarm system. Approved conduits are required for the wires leading to and from the enclosure.

Prior electrical components and connections that meet the provisions of the appropriate codes leave much to be desired when applied to outdoor sanitary systems. In prior approved installations, the enclosures are usually located several inches from the sewer risers, and they are often supported above ground level in an exposed condition by conduit or pipe. Such installations look amateurish. Worse, the enclosures are vulnerable to damage from lawn mowers and other yard and garden equipment, as well as to children playing in the area. Even with approved enclosures and other components, it is particularly troublesome to separate the lower voltage alarm system wiring from the higher voltage pump wiring.

Because of the unsatisfactory nature of prior approved components and connections for outdoor sanitary systems, many contractors install non-approved electrical systems. Those systems frequently place the enclosures below grade where they are protected from mechanical damage but susceptible to corrosion. In some instances, the high and low voltage wires are placed side by side within an enclosure. In other installations, no enclosure of any kind is used; the pump and supply wires are connected inside the sewer riser itself.

Thus, a need exists for improvements in electrical wiring for outdoor sanitary systems.

SUMMARY OF THE INVENTION

In accordance with the present invention, an approved junction center is provided that neatly and inexpensively encloses the wire connections for an outdoor sanitary system. This is accomplished by apparatus that includes a relatively large diameter main tube and a smaller branch tube that extends between the main tube and the sanitary system sewer riser.

The main tube of the junction center is preferably made from four inch polyvinylchloride electrical conduit. The branch tube is two inch polyvinylchloride electrical conduit. The branch tube intersects the main tube at right angles approximately 12 inches from the main tube top end. The branch tube extends into the interior of the main tube about one inch. A bushing of deformable insulative material is inserted inside the branch tube.

To properly separate the system pump wires from different voltage alarm system wires, a long divider extends vertically within the interior of the main tube, thereby creating two different passages inside the main tube. To retain the divider in place, it fits within a vertical slot in the branch tube. The pump and alarm system wires are separated within the branch tube by the insulative bushing.

To use the junction center of the present invention, the usual trench is dug for the wires leading from the source of power, which may be a nearby residence, to the system sewer riser. The pump and alarm system wires from the residence are passed through the bottom end of the main tube on opposite sides of the divider and out the top end of the main tube. The main tube is set vertically against the outside of the sewer riser with the branch tube protruding through a preformed hole in the riser. The top of the main tube is approximately level with the top of the sewer riser. A flexible metal strap is used to hold the main tube to the sewer riser.

The wires from the pump pass through the interior of the insulative bushing in the junction center branch tube and into the same passage as the pump wires from the residence and out the top of the main tube. The alarm system wires from the sewer riser are inserted between the insulative bushing and the branch tube wall and into the same main tube passage as the alarm system wires from the residence and out the top of the main tube. The connections for the pump and alarm system wires can then be easily made outside the main tube. Then the excess wire is pushed back into the main tube on appropriate Sides of the divider. A snug fitting cap is placed on top of the main tube, and the installation is finished. The result is a safe and attractive installation that meets all applicable codes.

Other advantages, benefits, and features of the invention will become apparent to those skilled in the art upon reading the detailed description of the invention.

BRIEF DESCRIPTION OF THE DRAWINGS

FIG. 3 is a cross sectional view taken along lines 3—3 of FIG. 2.

FIG. 4 is a further enlarged cross sectional view taken along lines 4—4 of FIG. 3.

FIG. 5 is a further enlarged cross sectional view taken along lines 5—5 of FIG. 3.

DETAILED DESCRIPTION OF THE INVENTION

Figure 1:
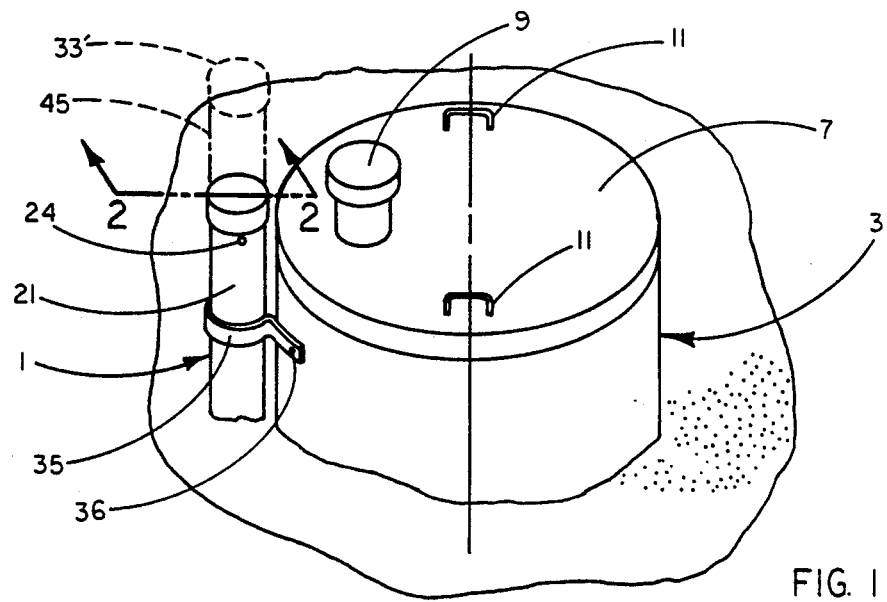
FIG. 1 is a perspective view of the junction center of the present invention installed on a sanitary mound system sewer riser.
Figure 2:
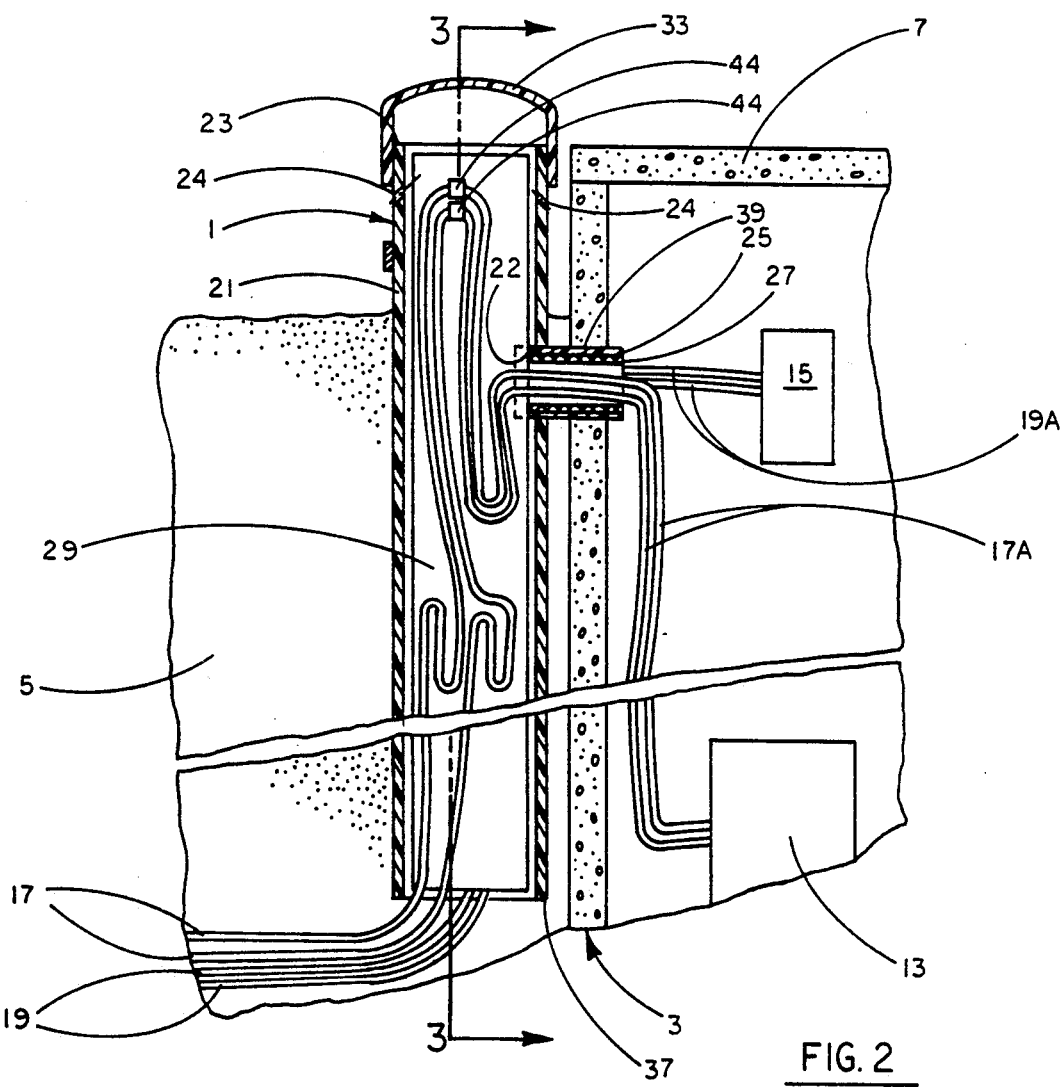
FIG. 2 is an enlarged, longitudinal cross sectional view taken along lines 2—2 of FIG. 1.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to the drawings, a junction center 1 is illustrated that includes the present invention. The junction center is particularly useful for facilitating wiring mound type sanitary systems and conventional septic systems that include lift stations. However, it will be understood that the invention is not limited to waste disposal applications.

As is known, a mound type sanitary system normally includes a tubular concrete sewer riser 3. The sewer riser 3 may be of different lengths and diameters; a length of approximately 40 inches and an outer diameter of approximately 30 inches are typical. The riser is embedded in the soil 5 of the mound with the riser longitudinal axis oriented vertically. A concrete cover 7 with a vent 9 is set on top of the riser. A chain, not shown, can be passed through handles 11 to prevent unauthorized removal of the cover 7.

The sewer riser 3 is used to enclose and protect various electrical and hydraulic components associated with the mound system. Such components include an electrically operated pump schematically represented by block 13 and an alarm system schematically represented by block 15.

Wiring for supplying electrical power to the pump 13 and alarm system 15 is normally supplied from the residence, not illustrated in the drawings, that uses the mound system. The supply wiring usually consists of 120 volt wiring 17 for the pump 13 and 24 volt wiring 19 for the alarm system 15. The supply wiring 17 and 19 is buried in the soil 5 between the residence and the sewer riser 3.

In accordance with the present invention, the connections of the supply wiring 17 and 19 from the residence to the wiring from the pump 13 and alarm system 15, respectively, are located within the junction center 1. The junction center is comprised of a main tube 21 of rigid electrical grade polyvinylchloride conduit such as is marketed under the trademark CARLON PLUS 400. Preferably, the main tube 21 has a nominal size of four inches and is approximately 38 inches long. A transverse hole 22 is cut through the wall of the main tube approximately 12 inches from its top end 23. A pair of inwardly and upwardly angled holes 24 of approximately 0.25 inches diameter are drilled near the main tube top end 23.

A short branch tube 25 of two inch nominal size rigid electrical polyvinylchloride conduit is bonded into the main tube 21 through the hole 22. The branch tube 25 may have a length of approximately two inches. A tubular bushing 27 of flexible insulative material, such as STYROFOAM material, is inserted rather loosely inside the branch tube.

To divide the interior of the main tube into two passages 41 and 43, the junction center 1 further comprises a divider 29. The divider 29 may be a flat plate of plastic or non-conductive material approximately ⅛ inch thick, 3½ inches wide, and 40 inches long. The divider 29 is retained in a vertical orientation inside the main tube by means of a vertically oriented slot 31 formed in the end of the branch tube inside the main tube.

The top end 23 of the main tube 21 is covered with a cap 33. The junction center 1 is held in place against the sewer riser 3 by a flexible strap 35 and conventional fasteners 36.

To use the junction center 1 of the present invention, the sewer riser 3 and the rest of the mound sanitary system are constructed in the normal manner. Also, the supply wiring 17 and 19 is laid in a trench to the sewer riser in known manner. The junction center main tube 21 is set vertically in the trench, and the supply wires are led up through the main tube from the bottom end 37 thereof and out the top end 23. The branch tube 27 is pushed into the transverse hole 39 preformed in the sanitary sewer. The strap 35 is wrapped around the main tube and fastened to the sewer riser with the fasteners 36, thereby retaining the junction center securely in place adjacent the sewer riser.

The wiring 17A from the pump 13 inside the sewer riser 3 is pushed through the center of the insulative bushing 27 into the main tube 21, and out the main tube top end 23. The wires 19A from the alarm system 15 are pushed between the wall of the branch tube 25 and the bushing, into the main tube, and out its top end. The divider 29 is slid down the main tube from the top end thereof and through the slot 31 in the branch tube such that the high voltage pump wires 17, 17A are within one passage, such as passage 41, inside the main tube, and the alarm system wires 19, 19A are in the other passage, such as passage 43, inside the main tube. The connections of the wires 17 to 17A and 19 to 19A are then quickly accomplished outside of the junction center 1 using, for example, CORDON fittings 44. Such fittings provide an approved service disconnect for the pump and alarm system. When the connections are complete, the extra wire is pushed back into the main tube, with the wires 17, 17A being pushed back into the passage 41 of the main tube and the wires 19, 19A being pushed into passage 43. With the wiring securely connected and in place, the cap 33 is pushed over the main tube top end 23. A known fastener, not shown, may be used to hold the cap in place, and the installation is complete. The installation meets all code requirements, and the wiring is protected against damage from lawn mowers and the like. Further, children and other persons near the sanitary riser 3 and junction center 1 are fully protected from the wires. The angled holes 24 allow moisture to escape from the interior of the main tube 21 and thereby prevent condensation from forming inside the junction center 1.

Should it be necessary to service any of the pump or alarm system components, it is a simple matter to remove the cap 33 to obtain access to the connectors 44 and the wiring 17, 17A and 19, 19A. In addition, should grade levels change such that soil approaches the top end 23 of the junction center main tube 21, the main tube is easily extendable. For that purpose, the cap 33 is removed. Another tube of four inch electrical conduit of the desired length, such as extension tube 45 shown in phantom lines in FIG. 1 is butted against the top end 23 of the main tube 21. The extension tube 45 is joined to the main tube top end by a conventional conduit coupling, not shown. Then the cap is replaced on the extension tube 45, as represented by the phantom lines 33' in FIG. 1. In that manner, the junction center 1 can be easily altered after initial installation to suit changing grade conditions around the mound system.

In some installations, the alarm system 15 operates on the same voltage as the pump 13. In those cases, it is not necessary to separate the wires 17, 17A from the wires 19, 19A. Accordingly, the divider 29 is not used with the junction center 1.

Thus, it is apparent that there has been provided, in accordance with the invention, a junction center that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A junction center for enclosing electrical wires comprising:
   a. a main tube having a wall with a predetermined outer diameter and first and second ends and a longitudinal axis;
   b. a branch tube extending through the main tube wall at generally right angles to the longitudinal axis thereof, the branch tube having an outer diameter less than the outer diameter of the main tube, wherein:
      i. the branch tube has a first end located in he interior of the main tube and a second end located outside the main tube; and
      ii. the branch tube first end is formed with a slot;
   c. a bushing of flexible insulative material inserted into the branch tube;
   d. a cap snugly fit over the main tube first end; and
   e. a divider located in the main tube interior and received within the branch tube slot,
   so that first wires can enter the main tube from the second end thereof and second wires can enter the main tube through the branch tube and the first and second wires can be connected together inside the main tube, and the main tube interior is divided into two passages by the divider.

2. The junction center of claim 1 wherein:
   a. The cap is removable from the main tube first end;
   b. The junction center further comprises:
      i. an extension tube having a first end placed abutting the main tube first end and a second end; and
      ii. coupling means for joining the extension tube to the main tube first end to thereby extend the length of the main tube; and
   c. The cap is replaceable onto the extension tube second end.

3. Apparatus for enclosing electrical wires comprising:
   a. an elongated main tube having first and second ends and a wall that defines an interior, a first wire entering the main tube interior through the first end thereof;
   b. a branch tube extending through the wall of the main tube and having a first end in the interior of the main tube, wherein the branch tube first end is formed with a slot;
   c. a bushing of flexible insulative material inside the branch tube, a second wire entering the main tube interior through the bushing, the first and second wires being connected together inside the main tube;
   d. a cap snugly fitting over the main tube second end; and
   e. a divider inside the main tube and extending generally between the first and second ends thereof to divide the main tube interior into first and second passages, wherein the divider is received within the branch tube slot,
   so that the branch tube guides and locates the divider in the interior of the main tube.

4. In combination with a sewer riser having a wall with a transverse hole therethrough,
   a junction center for enclosing wiring of selected electrical components inside the sewer riser to electrical supply wires comprising;
   a. an elongated main tube having top and bottom ends and a wall that define an interior, the main tube being placed against and generally parallel to the sewer riser, the supply wires entering the main tube from the bottom end thereof;
   b. a branch tube extending transversely through the main tube wall and having a first end that extends into the main tube interior and a second end that extends through the transverse hole in the sewer riser, wherein the branch tube first end is formed with a vertically extending slot;
   c. a flexible bushing inside the branch tube, the wires for the selected components inside the sewer riser entering the main tube interior through the bushing for connecting to the supply wires inside the main tube;
   d. cap means for removably covering the main tube top end; and
   e. divider means for dividing the main tube interior into two passages, wherein the divider means comprises a generally flat divider that is received in the branch tube slot to be retained and guided thereby in a generally vertical orientation in the main tube interior,
   so that electrical wiring of two different voltages can pass through and be connected in separate passages in the main tube interior.

5. A method of wiring electrical components inside a sewer riser having a transverse hole therethrough comprising the steps of:
   a. providing a junction center comprising an elongated main tube having a wall that defines an interior and top and bottom ends, a branch tube extending through the mai tube wall and having a first end inside the main tube interior and a second end outside of the main tube, and a flexible insulative bushing inside the branch tube, wherein the step of providing a junction center comprises the step of providing a branch tube having a slot formed in the first end thereof;
   b. placing the junction center in an upright attitude against the sewer riser with the branch tube second end extending into the transverse hole in the sewer riser;
   c. running a first wire through the main tube interior from the bottom end thereof and out the top end thereof;
   d. running a second wire from the sewer riser into the main tube interior through the insulative bushing and out the top end of the main tube;
   e. connecting the first and second wires to each other outside the main tube;

f. pushing the connected first and second wires inside the main tube from the top end thereof;

g. placing a cap over the main tube top end; and h. inserting a divider into the main tube interior to divide the main tube interior into two passages, wherein the step of inserting a divider into the main tube interior comprises the step of inserting a divider through the slot of the branch tube and holding the divider in place in the main tube interior with the branch tube.

* * * * *